US011318416B2

(12) United States Patent
Wilkinson et al.

(10) Patent No.: US 11,318,416 B2
(45) Date of Patent: May 3, 2022

(54) CONVERSION OF GAS AND TREATMENT OF A SOLUTION

(71) Applicant: The University of British Columbia, Vancouver (CA)

(72) Inventors: David Wilkinson, North Vancouver (CA); Arman Bonakdarpour, Vancouver (CA); Alfred Lam, Vancouver (CA); Mohammad Saad Dara, North Vancouver (CA)

(73) Assignee: Mangrove Water Technologies Ltd., Vancouver (CA)

( * ) Notice: Subject to any disclaimer, the term of this patent is extended or adjusted under 35 U.S.C. 154(b) by 296 days.

(21) Appl. No.: 15/301,241

(22) PCT Filed: Apr. 2, 2015

(86) PCT No.: PCT/CA2015/050273
§ 371 (c)(1),
(2) Date: Sep. 30, 2016

(87) PCT Pub. No.: WO2015/149185
PCT Pub. Date: Oct. 8, 2015

(65) Prior Publication Data
US 2017/0014758 A1    Jan. 19, 2017

Related U.S. Application Data

(60) Provisional application No. 61/974,280, filed on Apr. 2, 2014.

(51) Int. Cl.
*C25B 1/04*        (2021.01)
*B01D 53/32*    (2006.01)
(Continued)

(52) U.S. Cl.
CPC ......... *B01D 53/326* (2013.01); *B01D 61/422* (2013.01); *B01D 61/46* (2013.01);
(Continued)

(58) Field of Classification Search
None
See application file for complete search history.

(56) References Cited

U.S. PATENT DOCUMENTS 7,727,374 B2    6/2010 Jones
2010/0200419 A1    8/2010 Gilliam et al.
(Continued)

FOREIGN PATENT DOCUMENTS

CN         1468199 A       1/2004
CN       101475276 A       7/2009
(Continued)

OTHER PUBLICATIONS

Wang, G. et al., "Functional Polymer Material", Huadong Technology University Publication House, pp. 138-139, Aug. 2006.
(Continued)

*Primary Examiner* — Stefanie S Wittenberg
(74) *Attorney, Agent, or Firm* — Oyen Wiggs Green & Mutala LLP

(57) ABSTRACT

A method and system for reducing ion concentration of a solution and converting gas. The system comprising a multi-chamber unitary dialysis cell comprising a gas chamber, a product chamber, and an acid chamber. Ion exchange barriers separate the chambers of the dialysis cell. A first anion exchange barrier is positioned between the product chamber and the acid chamber and a first cation exchange barrier is positioned between the product chamber and the gas chamber. Anions from the solution being treated associate with cations from the acid chamber to form an acid solution in the acid chamber, and cations from the solution being treated
(Continued)

associate with anions from the fluid comprising gas to form salt, thereby reducing the ion concentration of the solution being treated and converting at least a portion of the gas into salt.

15 Claims, 15 Drawing Sheets

(51) Int. Cl.
| | |
|---|---|
| *B01D 61/46* | (2006.01) |
| *B01D 61/54* | (2006.01) |
| *C02F 1/469* | (2006.01) |
| *B01D 61/42* | (2006.01) |
| *C02F 103/08* | (2006.01) |
| *C02F 103/18* | (2006.01) |
| *C02F 1/461* | (2006.01) |
| *B01D 53/14* | (2006.01) |

(52) U.S. Cl.
CPC ............ *B01D 61/54* (2013.01); *C02F 1/4693* (2013.01); *C25B 1/04* (2013.01); *B01D 53/1456* (2013.01); *B01D 2251/304* (2013.01); *B01D 2251/604* (2013.01); *B01D 2252/103* (2013.01); *B01D 2252/20* (2013.01); *B01D 2252/602* (2013.01); *B01D 2255/20753* (2013.01); *B01D 2256/12* (2013.01); *B01D 2256/16* (2013.01); *B01D 2256/24* (2013.01); *B01D 2257/302* (2013.01); *B01D 2257/304* (2013.01); *B01D 2257/404* (2013.01); *B01D 2257/504* (2013.01); *B01D 2311/18* (2013.01); *B01D 2311/246* (2013.01); *C02F 2001/46142* (2013.01); *C02F 2103/08* (2013.01); *C02F 2103/18* (2013.01); *C02F 2201/4613* (2013.01); *C02F 2201/46115* (2013.01); *C02F 2201/46135* (2013.01); *C02F 2209/003* (2013.01); *C02F 2209/006* (2013.01); *C02F 2209/06* (2013.01); *Y02E 60/36* (2013.01); *Y02P 20/151* (2015.11); *Y02W 10/37* (2015.05)

(56) References Cited

U.S. PATENT DOCUMENTS

| | | | |
|---|---|---|---|
| 2013/0034489 A1* | 2/2013 | Gilliam | .................. C01F 11/18 |
| | | | 423/430 |
| 2014/0202874 A1* | 7/2014 | Elgammal | ................ C25B 1/00 |
| | | | 205/555 |

FOREIGN PATENT DOCUMENTS

| | | |
|---|---|---|
| EP | 0286143 A1 | 10/1988 |
| WO | 2004070377 A2 | 8/2004 |
| WO | 2010009273 A1 | 1/2010 |
| WO | 2010087823 A1 | 8/2010 |
| WO | 2012006601 A2 | 1/2012 |
| WO | 2012085552 A1 | 6/2012 |

OTHER PUBLICATIONS

Zhang, Yuguo, Aerospace Medical Engineering Foundation, "(II) Electrochemical Polarization Cell Technology for Purification and CO2 Collection", National Defense Industry Press, 1st edition, Aug. 1991, pp. 391-392.

* cited by examiner

CONVERSION OF GAS AND TREATMENT OF A SOLUTION

TECHNICAL FIELD

The present disclosure relates to a system and method for converting gas and treating a solution.

BACKGROUND

Greenhouse gas emissions, of which carbon dioxide emissions are a major contributor, are directly linked to climate change. According to the United States Environmental Protection Agency, over 50% of the carbon dioxide emitted in the period between 1990 and 2010 originated from power production and industrial processes. Methods aimed at reducing carbon emissions have included: (i) eliminating carbon consumption at the source by using non-fossil fuel based power sources such as solar, wind, hydroelectric and nuclear; (ii) reducing overall consumption; and (iii) utilizing techniques such as carbon dioxide capture and geological sequestration.

Several carbon dioxide separation, capturing and conversion processes are known including: (i) combusting fossil fuels with pure oxygen to generate purer carbon dioxide streams; (ii) scrubbing emission sources with solvents such as sodium hydroxide or monoethanolamine to remove carbon dioxide from gaseous streams; (iii) using thermolytic process or membranes to separate the carbon dioxide from other emissions; and (iv) using molecular sieves for the adsorption of carbon dioxide. Geological sequestration of carbon dioxide involves capture and transport of carbon dioxide to suitable sites where it may be stored in deep aquifers, abandoned oil wells, geological formations, soil, or injected into the ocean. However, underground geological mineralization of carbon dioxide is a risky endeavour, and requires at least a detailed knowledge of the characteristics of the storage site, general expenses in pumping the captured greenhouse gas underground, and knowledge of the availability and proximity of underground saline reservoirs to the storage location.

Water is also a proven medium of greenhouse gas sequestration, as evidenced by the fact that oceans are a major carbon sink in the world. Carbon dioxide undergoes the following reactions in water:

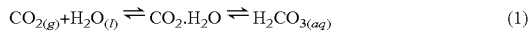
$$CO_{2(g)} + H_2O_{(l)} \rightleftharpoons CO_2.H_2O \rightleftharpoons H_2CO_{3(aq)} \quad (1)$$

$$H_2CO_{3(aq)} \rightleftharpoons HCO_3^-{}_{(aq)} + H^+{}_{(aq)} \quad (2)$$

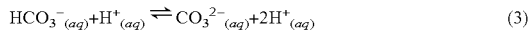
$$HCO_3^-{}_{(aq)} + H^+{}_{(aq)} \rightleftharpoons CO_3^{2-}{}_{(aq)} + 2H^+{}_{(aq)} \quad (3)$$

Similarly, $NO_x$ compounds, such as nitrogen dioxide, undergo the following reactions in water:

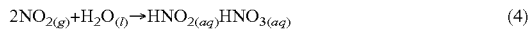
$$2NO_{2(g)} + H_2O_{(l)} \rightarrow HNO_{2(aq)}HNO_{3(aq)} \quad (4)$$

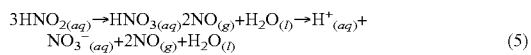
$$3HNO_{2(aq)} \rightarrow HNO_{3(aq)} 2NO_{(g)} + H_2O_{(l)} \rightarrow H^+{}_{(aq)} + NO_3^-{}_{(aq)} + 2NO_{(g)} + H_2O_{(l)} \quad (5)$$

Similarly, $SO_x$ compounds, such as sulfur dioxide, undergo the following reactions in water:

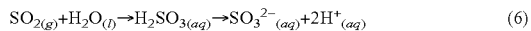
$$SO_{2(g)} + H_2O_{(l)} \rightarrow H_2SO_{3(aq)} \rightarrow SO_3^{2-}{}_{(aq)} + 2H^+{}_{(aq)} \quad (6)$$

Such sequestration, however, creates an abundance of ionic species dissolved in water, leaving the water in an ionically contaminated state.

Providing a reliable water source is a rising priority for many jurisdictions as they face population growth. Many industrial processes that consume water produce contaminated water that is unsuitable for reuse. Thus, there is an increasing level of interest in development of technologies that treat waste water. These include desalination by evaporation, reverse osmosis, use of membranes to remove contaminants, and disinfection with ultraviolet and chlorine among others.

In an exemplary system disclosed in U.S. Pat. No. 7,727,374, which utilizes the principles of the chlor-alkali process, an apparatus comprising an electrolysis chamber is adapted to produce hydroxide from the electrolysis of water in the presence of a salt. Carbon dioxide is absorbed into this aqueous caustic mixture and reacts with hydroxide to form carbonate and bicarbonate products. Halogen gas such as chlorine gas may also be formed in the process.

SUMMARY

The present disclosure generally relates to a system and method for converting gas and treating water.

According to a first aspect, there is provided a method for reducing ion concentration of a solution and converting gas comprising: providing a multi-chamber unitary dialysis cell with ion exchange barriers separating chambers of the dialysis cell, the dialysis cell comprising: (i) a gas chamber; (ii) a product chamber; and (iii) an acid chamber; and flowing a fluid comprising gas through the gas chamber, and flowing a solution being treated through the product chamber. A first anion exchange barrier is positioned between the product chamber and the acid chamber and a first cation exchange barrier is positioned between the product chamber and the gas chamber. Anions in the solution being treated migrate across the first anion exchange barrier to associate with cations in the acid chamber to form an acid solution in the acid chamber, and cations in the solution being treated migrate across the first cation exchange barrier to associate with anions from the fluid comprising gas to form salt, thereby reducing the ion concentration of the solution being treated and converting at least a portion of the gas into salt.

According to a second aspect, there is provided a system for reducing ion concentration of a solution and converting gas comprising: (a) a multi-chamber unitary dialysis cell with ion exchange barriers separating chambers of the dialysis cell, the dialysis cell comprising: (i) a gas chamber; (ii) a product chamber; and (iii) an acid chamber; (b) a manifolding assembly comprising gas chamber manifolding and product chamber manifolding fluidly coupled to the gas chamber and the product chamber respectively; (c) a fluid comprising gas conveyed to and away from the gas chamber by the gas chamber manifolding; and (d) a solution being treated conveyed to and away from the product chamber by the product chamber manifolding. A first anion exchange barrier is positioned between the product chamber and the acid chamber and a first cation exchange barrier is positioned between the product chamber and the gas chamber. Anions in the solution being treated migrate across the first anion exchange barrier to associate with cations in the acid chamber to form an acid solution in the acid chamber, and cations in the solution being treated migrate across the first cation exchange barrier to associate with anions from the fluid comprising gas to form salt, thereby reducing the ion concentration of the solution being treated and converting at least a portion of the gas into salt.

According to a third aspect, there is provided a power generation plant comprising the system of the second aspect and a power generator for generating power from hydrogen and oxygen produced by the cathode and anode respectively.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

Figure 6A:
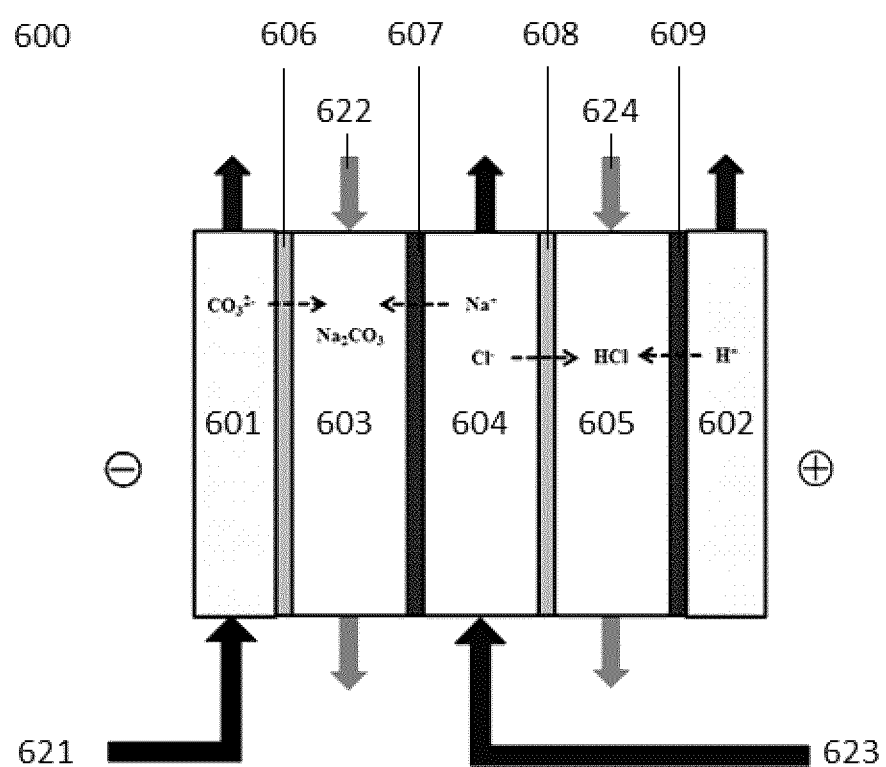
FIG. 6(a) and FIG. 6(b) are schematic diagrams of a five chamber electrodialysis cell according to an embodiment.
Figure 6B:
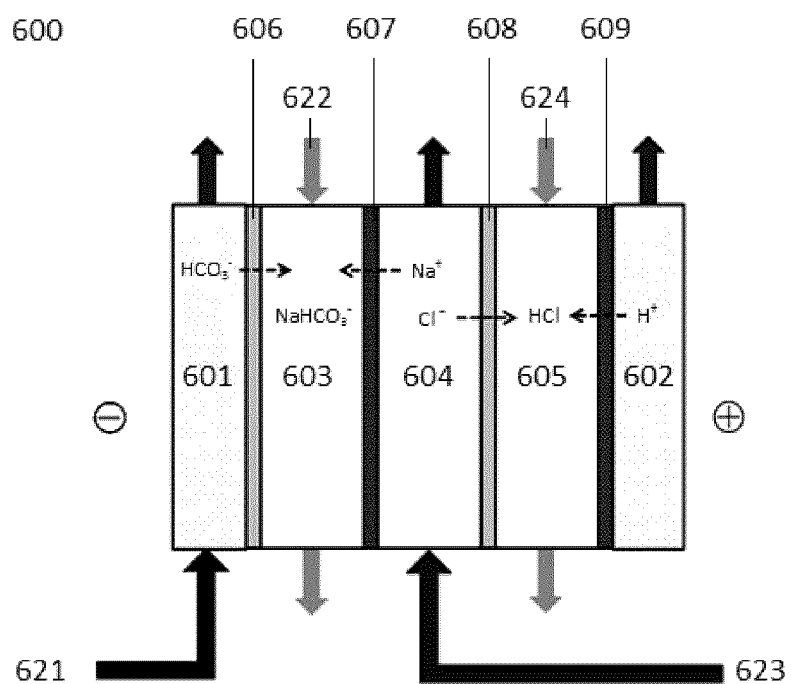

FIB. 10 is a graph showing operating current and voltage of the electrodialysis cell of FIG. 6(b) over 8 hours of testing.

Figure 11:
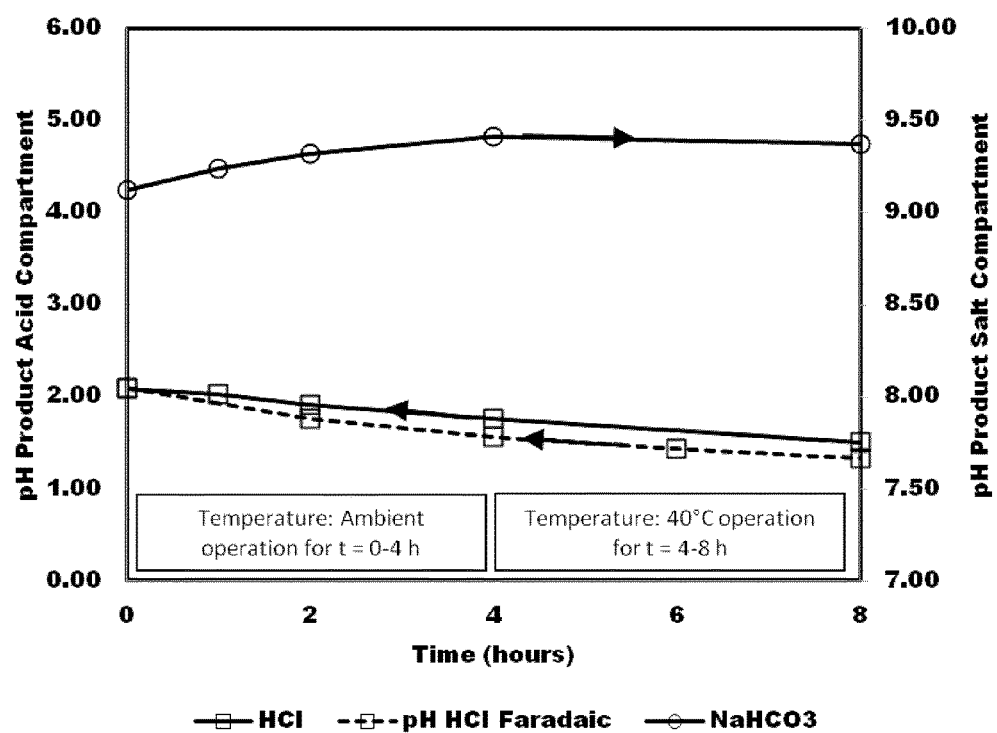

FIG. 11 is a graph showing pH of acid (HCl) in an acid chamber (pH product acid compartment) and pH of salt (NaHCO3) in a salt concentration chamber (pH product salt compartment) of the electrodialysis cell of FIG. 6(b) over the 8 hours of testing, as well as the expected pH of the acid according to Faraday's law (pH HCl Faradaic).

Figure 12:
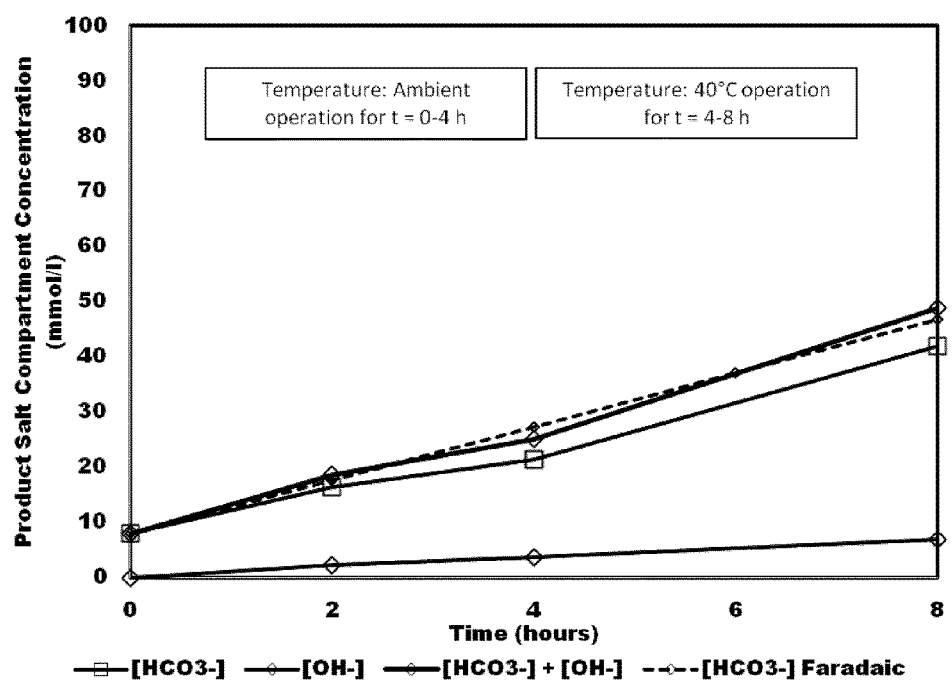

FIG. 12 is a graph showing concentration (mmol/l) of bicarbonate ions ([HCO3$^-$]), hydroxide ions ([OH$^-$]) and bicarbonate plus hydroxide ions ([HCO3$^-$]+[OH$^-$]) in the salt concentration chamber (product salt compartment) of the electrodialysis cell of FIG. 6(b) over the 8 hours of testing, as well as expected change in concentration of bicarbonate ions according to Faraday's law ([HCO3$^-$] Faradaic).

Figure 13:
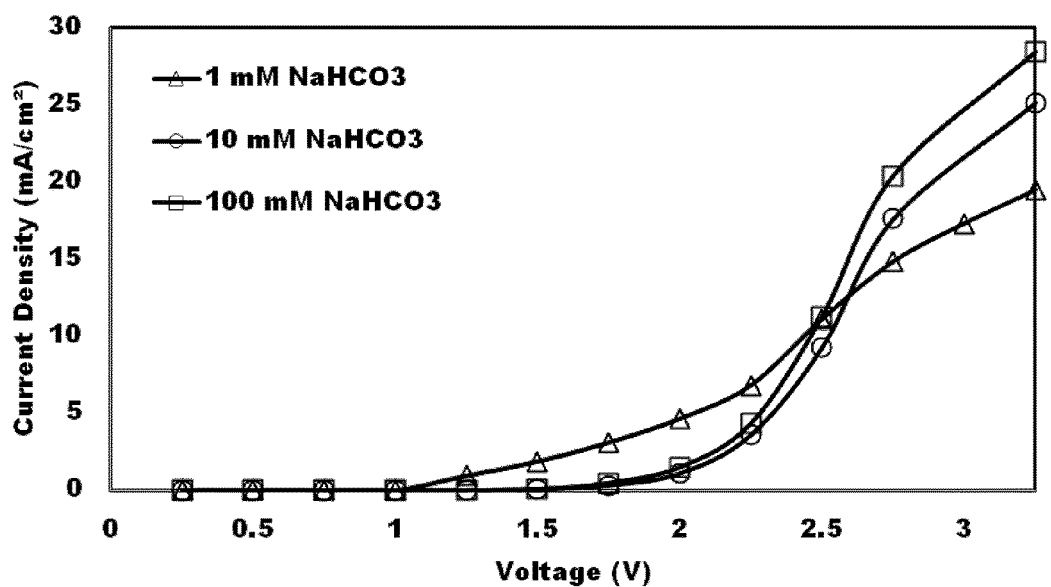

FIG. 13 is a graph showing cell polarization curves (current density and voltage) of different concentrations of sodium bicarbonate (NaHCO$_3$).

Figure 14:
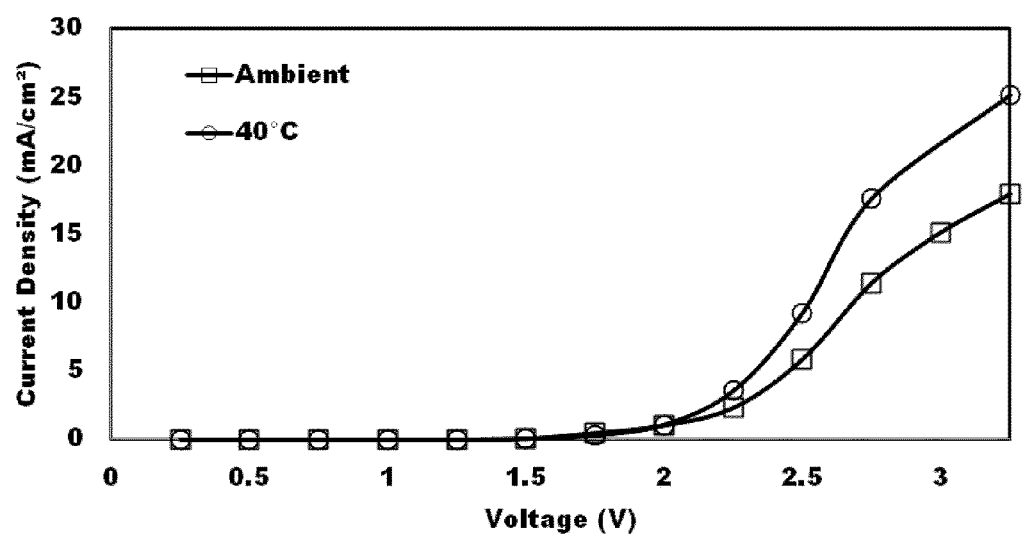

FIG. 14 is a graph showing cell polarization curves (current density and voltage) at ambient temperature and 40° C.

DETAILED DESCRIPTION

Directional terms such as "upper", "lower", "bottom", "top", "right" and "left" are used in the following description for the purpose of providing relative reference only, and are not intended to limit the embodiments of the present disclosure in any way. The plural and singular forms may be used interchangeably without limitation to the embodiments of the present disclosure in any way.

Embodiments described herein relate to an apparatus, system and method for conversion of gas and treating (desalinating) a solution using a multi-chamber unitary dialysis cell comprising a gas chamber, a product chamber, and an acid chamber. The multi-chamber dialysis cell may also include a salt concentration chamber positioned between the product chamber and the gas chamber. One or more walls of each of the gas chamber, product chamber and acid chamber comprise ion exchange barriers which separate the chambers of the dialysis cell. Ionic species (ions) selectively migrate across the ion exchange barriers. Gas, for example, but not limited to, greenhouse gas (e.g. carbon dioxide, $NO_x$, and $SO_x$) or hydrogen sulfide ($H_2S$) may be dissolved in an aqueous or non-aqueous solvent (e.g. water-based medium, amine, or other high carbon dioxide solubility solvent) to form a gas solution that is fed into the gas chamber of the dialysis cell. Gas may be dissolved in the solvent externally or in-situ by introducing the gas into the solvent by processes such as bubbling and stream mixing. The solubility of these gases in the solvent may be aided by additives such as Ni particles and non-aqueous organic solvents. Using carbon dioxide as the gas and water as the solvent as an example, carbon dioxide dissolves in water to form bicarbonate ($HCO_3^-$) and carbonate ($CO_3^{2-}$) ions. Alternatively, the fluid fed into the gas chamber may be a gas or mixture of gases or a two phase liquid/gas fluid.

A solution being treated is fed into the product chamber and cations and anions migrate from the solution in the product chamber to adjacent chambers, thereby reducing the ion concentration of the solution. The solution may be any saltwater solution such as brine, seawater or wastewater, or any solution being treated to reduce the concentration of ions therein, for example industrial waste solutions from oil and gas, mining, forestry, etc. Any type of aqueous or non-aqueous stream consisting of ions or non-ionic species that could be made into ions by the addition of other chemicals or by processing could potentially be utilized.

In electrodialysis an electric potential gradient may be generated between an anode and cathode. In an aqueous setting, the anode and the cathode generally undergo the following half-cell reactions respectively:

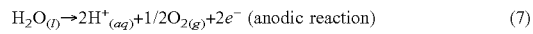
$$H_2O_{(l)} \rightarrow 2H^+_{(aq)} + 1/2O_{2(g)} + 2e^- \text{ (anodic reaction)} \quad (7)$$

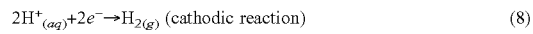
$$2H^+_{(aq)} + 2e^- \rightarrow H_{2(g)} \text{ (cathodic reaction)} \quad (8)$$

The dialysis cell of the disclosed embodiments includes a plurality of chambers, creating a "stack" of chambers, and walls of the chambers comprise ion exchange barriers separating the chambers. Ion exchange barriers (e.g. membranes) in the dialysis cell generally do not require regeneration, thereby reducing the need for chemical inputs over ion exchange processes. Inorganic scaling of ion exchange barriers and ion exchange barrier fouling can be managed through polarity reversal, periodic flushes and/or acid washes.

The ion exchange barriers of the dialysis cell include cation exchange barriers which selectively allow migration of cations, and anion exchange barriers which selectively allow migration of anions. The ion exchange barriers may be water permeable. The ion exchange barriers may be ion exchange membranes and may include, but are not limited to, commercially available bi-polar membranes and membranes with chemical modifications such as: (i) perfluorinated films with fixed pyridine or sulfonic groups; (ii) polyetherketones; (iii) polysulfonones; (iv) polyphenylene oxides; (v) polystyrene; (vi) styrene-divinyl benzene; (vii) polystyrene/acrylic based fabrics with sulfonate and quaternary ammonium cations; (viii) polyfluorinated sulfuric acid polymers; or (ix) resin-polyvinylidenedifluoride fabrics. In alternative embodiments, other ion exchange barriers may be utilized.

The electrodialysis cells of the described embodiments generally include a cathode and anode, which may be constructed of conductive porous or non-porous substrates, and coated with a catalyst or catalysts. The ion exchange barrier (such as an ion exchange membrane) may alternatively or additionally be coated with a catalyst or catalyst. These catalysts may enhance the rate of reactions in the dialysis cell. Suitable catalysts include, but are not limited to, precious or non-precious transition metals and their compounds (e.g. oxides, nitrides, etc.). The catalysts could be supported onto for example metal, metal oxides, metal nitrides, etc. or unsupported. A mixture of one or more catalysts, option binder and other optional additives (for example hydrophilic and/or hydrophobic additives to control liquid and gas bubble removal), may be applied to the electrode and/or ion exchange barrier by a variety of techniques known in the art, such as spraying, sputtering, screen printing and the like. Fluids can flow in the cell via flow fields (open channels like serpentine, inter-digitated, etc.), porous closed channels, or open pocket. The cell could be operated under pressure or pressure differentials.

In operation, an electric potential may be applied between the cathode and anode to facilitate the occurrence of electrochemical reactions at the electrodes and migration of ions across the ion exchange membranes. In a dialysis cell, an electric potential may be applied between conductors to create an electric field to enhance migration of ions across the ion exchange membranes and chambers without any electrochemical reactions occurring. However, the application of an electric potential between the conductors is not necessary for operation as ions may diffuse through the ion exchange membranes under the influence of other transport mechanisms such as a concentration gradient.

In the described embodiments, solutions may be conveyed into and away from chambers of the dialysis cell using a manifolding assembly which may include conduits, optional valves and other equipment known in the art to convey solutions to and away from chambers of a dialysis cell.

Figure 1:
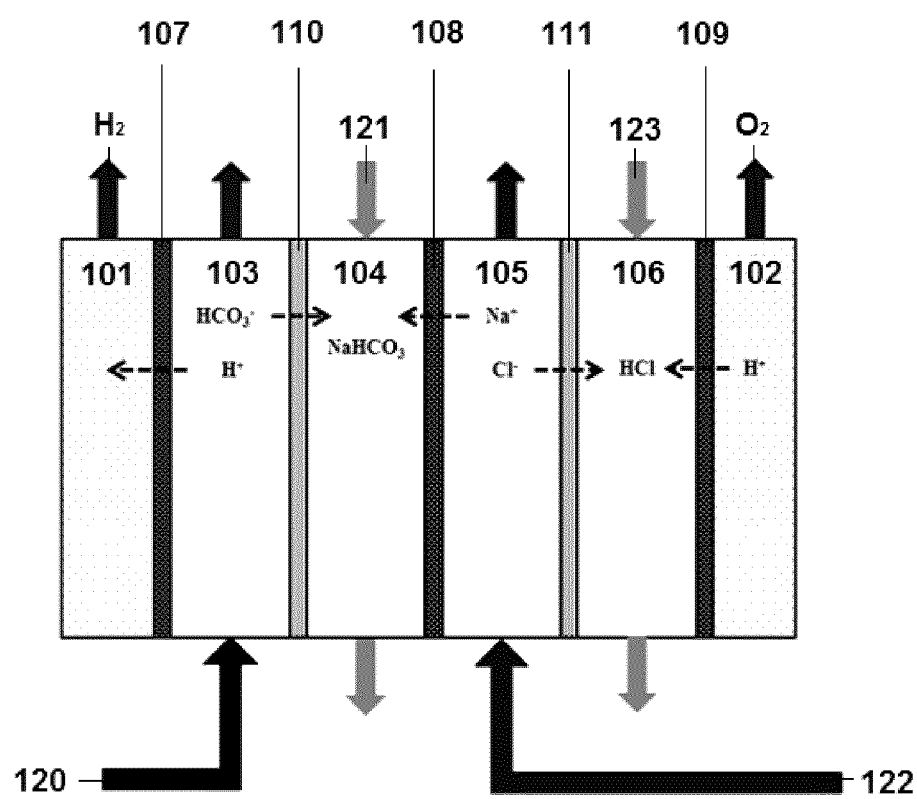
FIG. 1 is a schematic diagram of a six chamber electrodialysis cell according to an embodiment.

Referring to FIG. 1 and according to an embodiment, there is shown an electrodialysis cell 100 including a cathode chamber 101 with a cathode (not shown) disposed therein and an anode chamber 102 with an anode (not shown) disposed therein at either end of the cell 100. Disposed between the cathode chamber 101 and anode chamber 102 are chambers 103, 104, 105 and 106. Disposed between: (i) cathode chamber 101 and chamber 103 is cation exchange membrane 107; (ii) chamber 103 and 104 is anion exchange membrane 110; (iii) chamber 104 and 105 is cation exchange membrane 108; (iv) chamber 105 and 106 is anion exchange membrane 111; and (v) chamber 106 and anode chamber 102 is cation exchange membrane 109. In operation, an electric potential is applied between the cathode in chamber 101 and the anode in chamber 102 to cause electrochemical reactions (7) and (8) to occur and to facilitate migration of ions across the ion exchange membranes.

Gas, for example greenhouse gas is dissolved in an aqueous or non-aqueous solvent (e.g. water-based medium, amine, or other high carbon dioxide solubility solvent) to form solution 120. Gas may be dissolved in the solvent externally or in-situ by introducing the gas into the solvent by processes such as bubbling and stream mixing. The solubility of the gas in the solvent may be aided by additives such as Ni particles and non-aqueous organic solvents or by application of pressure. Using carbon dioxide as the gas and water as the solvent as an example, carbon dioxide dissolves in water to form bicarbonate ($HCO_3^-$) and carbonate ($CO_3^{2-}$) ions. The bicarbonate and carbonate ions in chamber 103 migrate through anion exchange membrane 110 into chamber 104. Similarly, the cations (e.g. protons) migrate through cation exchange membrane 107 towards the cathode in chamber 101. The protons that migrate to the cathode are then reduced in cathodic half-cell reaction (8) leading to the production of hydrogen gas. Solution 120 having reduced bicarbonate and carbonate ions exits chamber 103 and is recovered.

Solution 122 is fed into chamber 105. Solution 122 may be any saltwater solution such as brine, seawater or wastewater or any solution being treated to reduce the concentration of ions therein. Cations (e.g. sodium ions) in chamber 105 migrate through cation exchange membrane 108 into chamber 104. Similarly, anions (e.g. chloride ions) in chamber 105 migrate through anion exchange membrane 111 into chamber 106. Solution 122 having a reduced ion concentration exits chamber 105 and is recovered.

Solution 121 is fed into chamber 104 and comprises water or ionic species. For example, where solution 120 is carbon dioxide dissolved in water and solution 122 is brine, the solution 121 entering chamber 104 may contain sodium bicarbonate. In chamber 104, anions (e.g. bicarbonate ions) that have migrated into chamber 104 from chamber 103 associate with cations (e.g. sodium ions) that have migrated into chamber 104 from chamber 105. Solution 121 with an increased concentration of salt (e.g. sodium bicarbonate) is recovered from chamber 104.

Solution 123 comprising water or acid is conveyed into chamber 106. In chamber 106, anions (e.g. chloride ions) that have migrated into chamber 106 from chamber 105 associate with protons that have migrated into chamber 106 from anode chamber 102 through cation exchange membrane 109. These protons are generated by the anodic half-cell reaction (7) of water at the anode in chamber 102. The half-cell reaction (7) of water also leads to the production of oxygen at the anode in chamber 102. Solution 123 with an increased concentration of acid (e.g. hydrochloric acid) is recovered from chamber 106.

Figure 2:
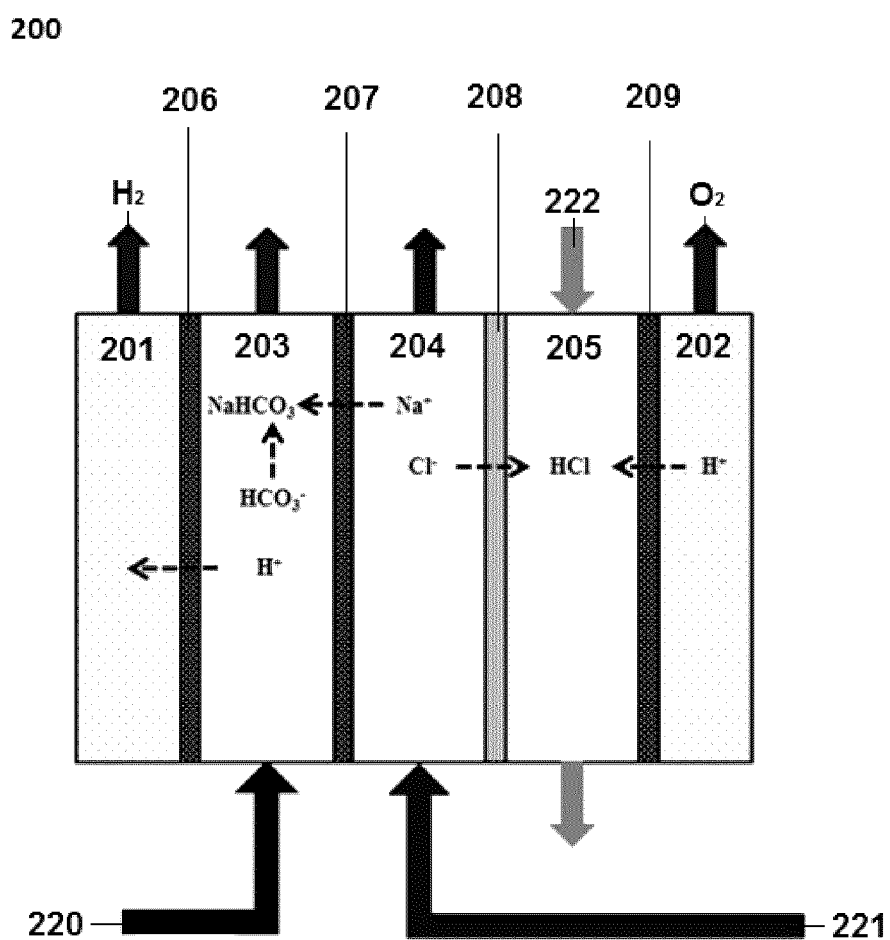
FIG. 2 is a schematic diagram of a five chamber electrodialysis cell according to an embodiment.

Referring to FIG. 2 and according to an alternative embodiment, there is shown an electrodialysis cell 200 including a cathode (not shown) disposed in chamber 201 and an anode (not shown) disposed in chamber 202 at either end of the cell 200. Disposed between the chambers 201 and 202 are chambers 203, 204, and 205. Disposed between: (i) cathode chamber 201 and chamber 203 is cation exchange membrane 206; (ii) chamber 203 and 204 is cation exchange membrane 207; (iii) chamber 204 and 205 is anion exchange membrane 208; and (iv) chamber 205 and anode chamber 202 is cation exchange membrane 209. In operation, an electric potential is applied between the cathode in chamber 201 and the anode in chamber 202 to cause electrochemical reactions (7) and (8) to occur and to facilitate migration of ions across the ion exchange membranes.

Solution 221 is delivered into chamber 204. Solution 221 may be any saltwater solution such as brine, seawater or wastewater or any solution being treated to reduce the concentration of ions therein. Cations (e.g. sodium ions) in chamber 204 migrate through cation exchange membrane 207 and into chamber 203. Similarly, anions (e.g. chloride ions) in chamber 204 migrate through anion exchange membrane 208 and into chamber 205. Solution 221 having a reduced ion concentration exits chamber 204 and is recovered.

Gas is dissolved into a solvent to form solution 220. Dissolved gas takes the form of related ionic species in solution 220 (see for example reactions (1) to (6)), and solution 220 is delivered into chamber 203. The cations (e.g. protons) in chamber 203 migrate through cation exchange membrane 206 and into cathode chamber 201. The protons that migrate to the cathode in chamber 201 are then reduced in half-cell reaction (8) leading to the production of hydrogen gas. The anions (e.g. bicarbonate ions) in solution 220 remain in chamber 203 and are unable to migrate through either one of cation exchange membrane 206 or 207 which flank chamber 203. These anions associate with cations (e.g. sodium ions) that migrate from chamber 204 to chamber 203 through cation exchange membrane 207. Solution 220 with an increased concentration of salt (e.g. sodium bicarbonate) is recovered from chamber 203.

Solution 222 comprising water or acid is delivered into chamber 205. In chamber 205, anions (e.g. chloride ions) that have migrated into chamber 205 from chamber 204 associate with protons that have migrated into chamber 205 from anode chamber 202 through cation exchange membrane 209. These protons are generated by half-cell reaction (7) of water at the anode in chamber 202. Solution 222 with an increased concentration of acid (e.g. hydrochloric acid) is recovered from chamber 205.

Figure 3:
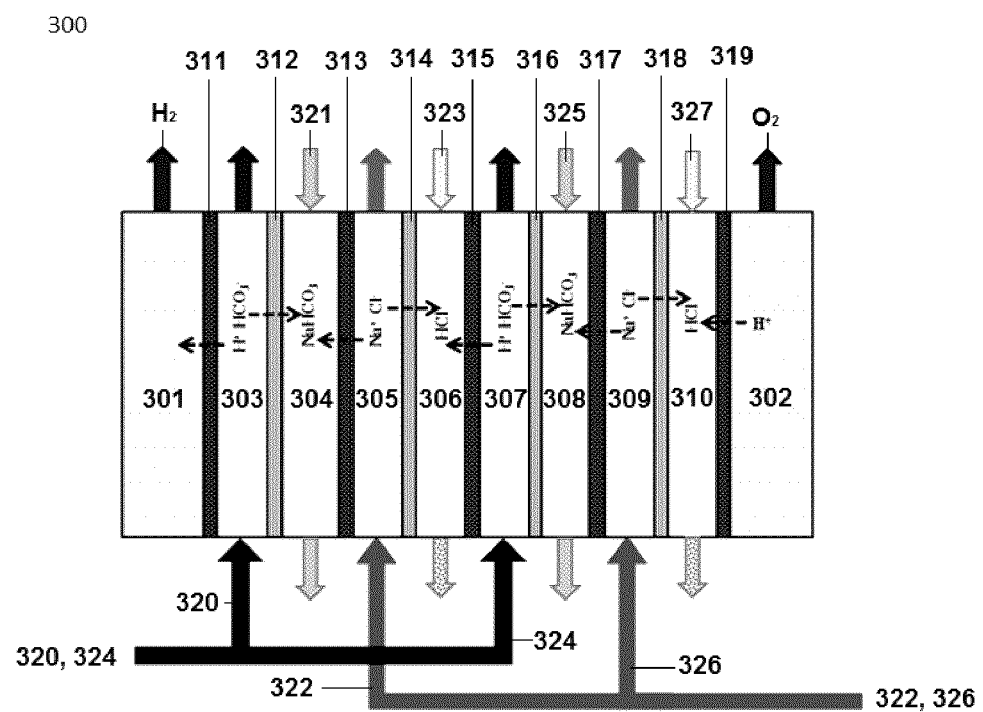
FIG. 3 is a schematic diagram of a ten chamber electrodialysis cell according to an embodiment.

Referring to FIG. 3 and according to an alternative embodiment, there is shown an electrodialysis cell 300 including a cathode (not shown) disposed in chamber 301 and an anode (not shown) disposed in chamber 302 at either end of the cell 300. Disposed between chambers 301 and 302 are chambers 303 to 310. Disposed between: (i) cathode chamber 301 and chamber 303 is cation exchange membrane 311; (ii) chamber 303 and 304 is anion exchange membrane 312; (iii) chamber 304 and 305 is cation exchange membrane 313; (iv) chamber 305 and 306 is anion exchange membrane 314; (v) chamber 306 and 307 is cation exchange membrane 315; (vi) chamber 307 and 308 is anion exchange membrane 316; (vii) chamber 308 and 309 is cation exchange membrane 317; (viii) chamber 309 and 310 is anion exchange membrane 318; and (ix) chamber 310 and anode chamber 302 is cation exchange membrane 319. In operation, an electric potential is applied between the cathode in chamber 301 and the anode in chamber 302 to cause electrochemical reactions (7) and (8) to occur and to facilitate migration of ions across the ion exchange membranes.

Gas is dissolved into a solvent to form solutions 320 and 324. Dissolved gas forms ionic species in solutions 320 and 324. For example, dissolved carbon dioxide in water form bicarbonate ($HCO_3^-$) and carbonate ($CO_3^{2-}$) ions. Solutions 320 and 324 enter into chambers 303 and 307 respectively. The anions (e.g. bicarbonate and carbonate) in chamber 303 migrate through anion exchange membrane 312 into chamber 304. The cations (e.g. protons) in chamber 303 migrate through cation exchange membrane 311 and into chamber 301. The protons that have migrated to the cathode in chamber 301 are then reduced in half-cell reaction (8) leading to the production of hydrogen gas. Similarly, the anions (e.g. bicarbonate and carbonate ions) in chamber 307 migrate through anion exchange membrane 316 into chamber 308. The cations (e.g. protons) in chamber 307 migrate through cation exchange membrane 315 into chamber 306. Solutions 320 and 324 with reduced ionic species exit chambers 303 and 307 respectively, and are recovered.

Solutions 322 and 326 enter into chambers 305 and 309 respectively. Solutions 322 and 326 may be any saltwater solution such as brine, seawater or wastewater, or any solution being treated to reduce the concentration of ions therein. Cations (e.g. sodium ions) in chamber 305 migrate through cation exchange membrane 313 into chamber 304. Anions (e.g. chloride ions) in chamber 305 migrate through anion exchange membrane 314 into chamber 306. Similarly, cations (e.g. sodium ions) in chamber 309 migrate through cation exchange membrane 317 into chamber 308. Anions (e.g. chloride ions) in chamber 309 migrate through the anion exchange membrane 318 into chamber 310. Solutions 322 and 326 with a reduced ion concentration exit chambers 305 and 309 respectively, and are recovered.

Solutions 321 and 325 comprising water or salt are delivered into chambers 304 and 308, respectively. For example, when solutions 320 and 324 contain carbon dioxide dissolved in water and solutions 322 and 326 are brine, the solutions 321 and 325 entering into chambers 304 and 308 respectively may comprise water or sodium bicarbonate. In chambers 304 and 308, anions (e.g. bicarbonate ions) that have migrated into these two chambers from adjacent chambers associate with cations (e.g. sodium ions) that have migrated into these two chambers from adjacent chambers. Solutions 321 and 325 with an increased salt concentration (e.g. sodium bicarbonate) are recovered respectively from chambers 304 and 308.

Solutions 323 and 327 comprising water or acid are delivered into chambers 306 and 310, respectively. Anions (e.g. chloride ions) that have migrated into chamber 306 from chamber 305 associate with protons that have migrated into chamber 306 from chamber 307. Similarly, anions that have migrated into chamber 310 from chamber 309 associate with protons that have migrated into chamber 310 from anode chamber 302. These protons are generated by half-cell reaction (7) of water at the anode in chamber 302. Solutions 323 and 327 with an increased acid concentration (e.g. hydrochloric acid) are recovered from chambers 306 and 310, respectively.

Figures 4A, 4B:
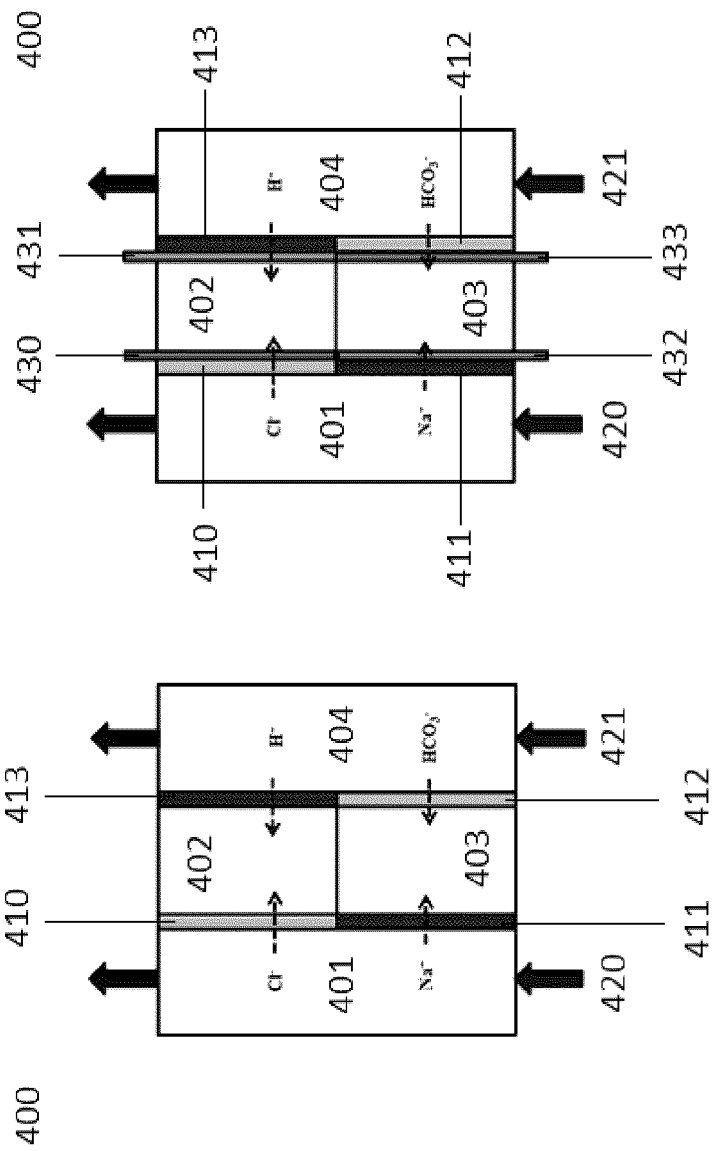
FIG. 4(a) is a schematic diagram of a four chamber dialysis cell according to an embodiment.
FIG. 4(b) is a schematic diagram of a four chamber dialysis cell according to an embodiment.

Referring to FIGS. 4(a) and 4(b), and according to an alternative embodiment, there is shown a dialysis cell 400 comprising chambers 401, 402, 403 and 404. Chambers 402 and 403 are disposed between chambers 401 and 404. An anion exchange membrane 410 is positioned between chamber 401 and chamber 402 and a cation exchange membrane 411 is positioned between chamber 401 and chamber 403. An anion exchange membrane 412 is positioned between chamber 404 and chamber 403 and a cation exchange membrane 413 is positioned between chamber 404 and chamber 402. Conductors 430 and 431 are optionally disposed in chamber 402, and conductors 432 and 433 are optionally disposed in chamber 403 (as depicted in FIG. 4(b)).

Solution 420 is delivered into chamber 401. Solution 420 may be any saltwater solution such as brine, seawater or wastewater, or any solution being treated to reduce the concentration of ions therein. Under the influence of a transport mechanism such as an electric field (as depicted in FIG. 4(b)) or another transport mechanism such as a concentration gradient (as depicted in FIG. 4(a)), cations (e.g. sodium ions) in chamber 401 migrate into chamber 403 through cation exchange membrane 411. Similarly, anions (e.g. chloride ions) in chamber 401 migrate into chamber 402 through anion exchange membrane 410. Solution 420 with a reduced ion concentration exits chamber 401 and is recovered.

Gas is dissolved into a solvent to form solution 421. Dissolved gas forms ionic species (e.g. bicarbonate ions) in solution 421. Solution 421 is delivered into chamber 404. The cations (e.g. protons) in chamber 404 move through cation exchange membrane 413 and into chamber 402. Similarly, anions (e.g. bicarbonate ions) in chamber 404 migrate into chamber 403 through anion exchange membrane 412. Solution 421 with a reduced concentration of ionic species exits chamber 404 and is recovered.

As a result of the migration of ionic species into chambers 402 and 403, a concentrated acidic solution (e.g. hydrochloric acid solution) and a concentrated salt solution (e.g. sodium bicarbonate solution) is recovered from chambers 402 and 403, respectively.

Figure 5:
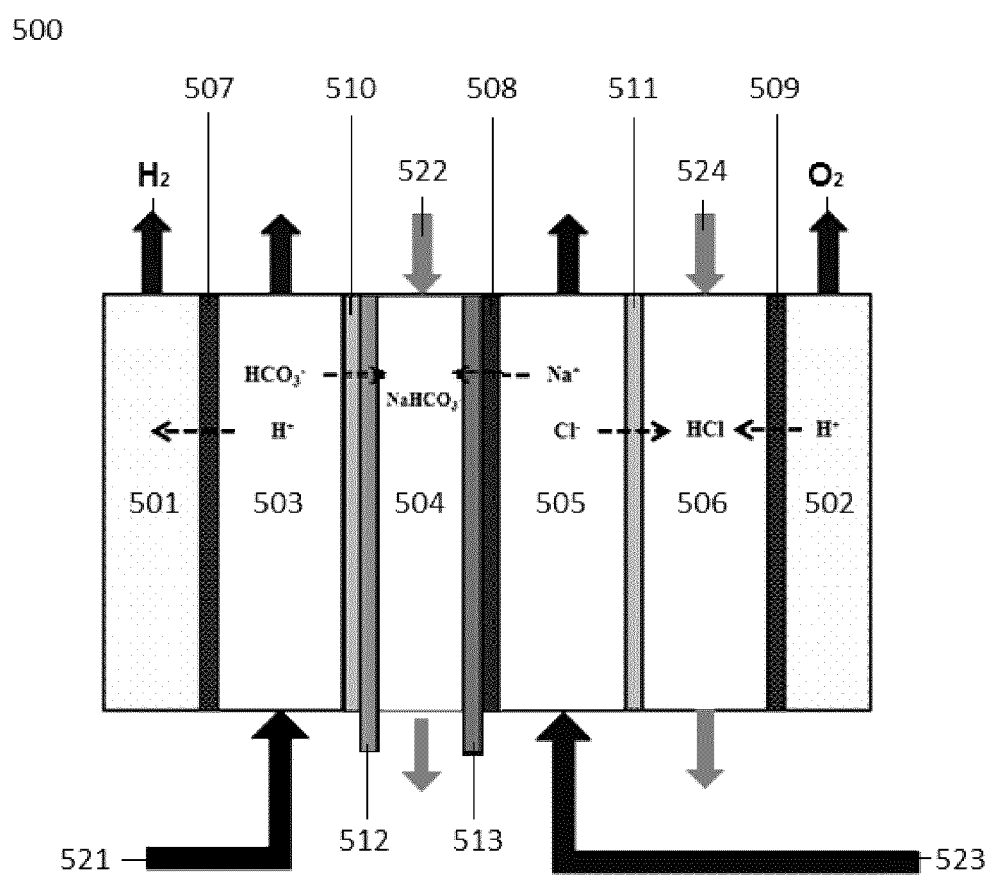
FIG. 5 is a schematic diagram of a six chamber electrodialysis cell according to an embodiment.

Referring to FIG. 5 and according to an alternative embodiment, there is shown an electrodialysis cell 500 including a chamber 501 with a cathode (not shown) disposed therein and a chamber 502 with an anode (not shown) disposed therein at either end of the cell 500. Disposed between the cathode chamber 501 and anode chamber 502 are chambers 503, 504, 505 and 506. Disposed between: (i) chamber 501 and chamber 503 is cation exchange membrane 507; (ii) chamber 503 and chamber 504 is anion exchange membrane 510; (iii) chambers 504 and 505 is cation exchange membrane 508; (iv) chambers 505 and 506 is anion exchange membrane 511; and (v) chambers 506 and 502 is cation exchange membrane 509. In operation, an electric potential is applied between the cathode in chamber 501 and the anode in chamber 502 to cause electrochemical reactions (7) and (8) to occur and to facilitate migration of ions across the ion exchange membranes.

To facilitate ionic transport into chamber 504, an electric field may be applied between conductor 512 and conductor 513 that have been optionally disposed within chamber 504. Conductors 512, 513 are porous and capable of adsorbing ions due to their pore size.

Solution 523 is delivered into chamber 505. Solution 523 may be any saltwater solution such as brine, seawater or wastewater, or any solution being treated to reduce the concentration of ions therein. Cations (e.g. sodium ions) in chamber 505 migrate into chamber 504 through cation exchange membrane 508. Anions (e.g. chloride ions) in chamber 505 migrate through the anion exchange membrane 511 and into chamber 506. Solution 523 with a reduced ion concentration exits chamber 505 and is recovered.

Gas is dissolved into a solvent to form solution 521. Dissolved gas forms ionic species (e.g. bicarbonate ions) in solution 521. Solution 521 is delivered into chamber 503. The cations (e.g. protons) in chamber 503 move through cation exchange membrane 507 and into chamber 501. The protons that migrate to the cathode in chamber 501 are then reduced in cathodic half-cell reaction (8) leading to the production of hydrogen gas. Anions (e.g. bicarbonate ions) in chamber 503 migrate into chamber 504 through anion exchange membrane 510. Solution 521 with a reduced concentration of ionic species exits chamber 503 and is recovered.

Solution 522 comprising water or ionic species is delivered into chamber 504. For example, solution 522 may be a solution containing sodium bicarbonate. In chamber 504, anions (e.g. bicarbonate ions) associate with cations (e.g. sodium ions). Solution 522 with an increased concentration of associated or dissociated ionic species (e.g. sodium bicarbonate) is recovered from chamber 504.

Solution 524 comprising water or acid is delivered into chamber 506. In chamber 506, anions (e.g. chloride ions) that have migrated into chamber 506 from chamber 505 associate with protons that have migrated into chamber 506 from chamber 502 and through cation exchange membrane 509. These protons are generated by the anodic half-cell reaction (7) of water at the anode in chamber 502. The half-cell reaction (7) of water also leads to the production of oxygen at the anode in chamber 502. Solution 524 with an increased acid concentration (e.g. hydrochloric acid) is recovered from chamber 506.

Referring to FIG. 6(a) and FIB. 6(b) and according to another embodiment, there is shown an electrodialysis cell 600 including a cathode (not shown) disposed in cathode chamber 601 and an anode (not shown) disposed in anode chamber 602 at either end of the cell 600. Disposed between chambers 601 and 602 are chambers 603, 604, and 605. Disposed between: (i) cathode chamber 601 and chamber 603 is anion exchange membrane 606; (ii) chamber 603 and chamber 604 is cation exchange membrane 607; (iii) chamber 604 and chamber 605 is anion exchange membrane 608; and (iv) chamber 605 and anode chamber 602 is cation exchange membrane 609. In operation, an electric potential is applied between the cathode in cathode chamber 601 and the anode in anode chamber 602 to cause the electrochemical reactions (7) and (9) and/or (10a-c) (see below) to occur and to facilitate migration of ions across the ion exchange membranes.

Solution 623 is delivered into chamber 604. Solution 623 may be any saltwater solution such as brine, seawater or wastewater, or any solution being treated to reduce the concentration of ions therein. Cations (e.g. sodium ions) in chamber 604 migrate into chamber 603 through cation exchange membrane 607. Anions (e.g. chloride ions) in chamber 604 migrate through the anion exchange membrane 608 and into chamber 605. Solution 623 with a reduced ion concentration exits chamber 604 and is recovered.

Gas is mixed with oxygen/air to form fluid 621 which may be a gas or a liquid, and fed onto the cathode chamber 601. When the gas is carbon dioxide gas in fluid 621 for example, the carbon dioxide may undergo one of the following half-cell reaction at the cathode in chamber 601 depending on different catalysts used in the cell 600 and the operating conditions within the cell (e.g. temperature, flow rate, humidity, pressure, etc):

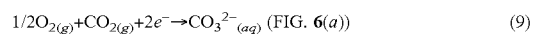

$$1/2O_{2(g)} + CO_{2(g)} + 2e^- \rightarrow CO_3^{2-}{}_{(aq)} \text{ (FIG. 6(a))} \tag{9}$$

$$1/2O_{2(g)} + H_2O_{(l)} + 2e^- \rightarrow 2OH^- \tag{10a}$$

$$OH^- + CO_{2(g)} \rightarrow HCO_3^- \text{ (FIG. 6(b))} \tag{10b}$$

$$HCO_3^- + OH^- \rightarrow CO_3^{2-} + H_2O_{(l)} \tag{10c}$$

Carbon dioxide gas may also be electro-reduced to other charged species such as formate ions. The type of half-cell reaction at the cathode may depend on reaction conditions and reactor operating conditions. Gas that does not participate in half-cell reactions, such as nitrogen gas in air, are vented. The produced carbonate ions ($CO_3^{2-}$), bicarbonate ions ($HCO_3^-$), hydroxide ions (OFF) (or other charged species such as formate ions) migrate through anion exchange membrane 606 into chamber 603. The bicarbonate ions, carbonate ions and other ions such as formate ions, may be produced electrochemically without the production of hydroxide or chemically by reacting carbon dioxide with hydroxide ions which are generated electrochemically. Use of a monovalent anion exchange membrane as anion exchange membrane 606 may selectively allow bicarbonate ions to migrate into chamber 603 whilst carbonate ions may be too large to migrate across the anion exchange membrane 606 into chamber 603.

Solution 622 comprising water or ionic species is delivered into chamber 603. For example, solution 622 may be a solution containing sodium carbonate, sodium bicarbonate or sodium hydroxide. In chamber 603, anions (e.g. carbonate ions, bicarbonate ions or hydroxide ions) associate with cations (e.g. sodium ions) to form a salt or a base (e.g. sodium carbonate, sodium bicarbonate or sodium hydroxide). Solution 622 containing an increased concentration of salt (e.g. sodium carbonate or sodium bicarbonate) is recovered from chamber 603. The recovered solution 622 may also have an increased concentration of a base (e.g. sodium hydroxide).

Solution 624 comprising water or acid is delivered into chamber 605. In chamber 605, anions (e.g. chloride ions) that have migrated into chamber 605 from chamber 604 associate with protons that have migrated into chamber 605 from anode chamber 602 through cation exchange membrane 609. These protons are generated by half-cell reaction (7) of water at the anode in anode chamber 602. Solution 624 with an increased acid concentration (e.g. hydrochloric acid) is recovered from chamber 605.

Figure 7:
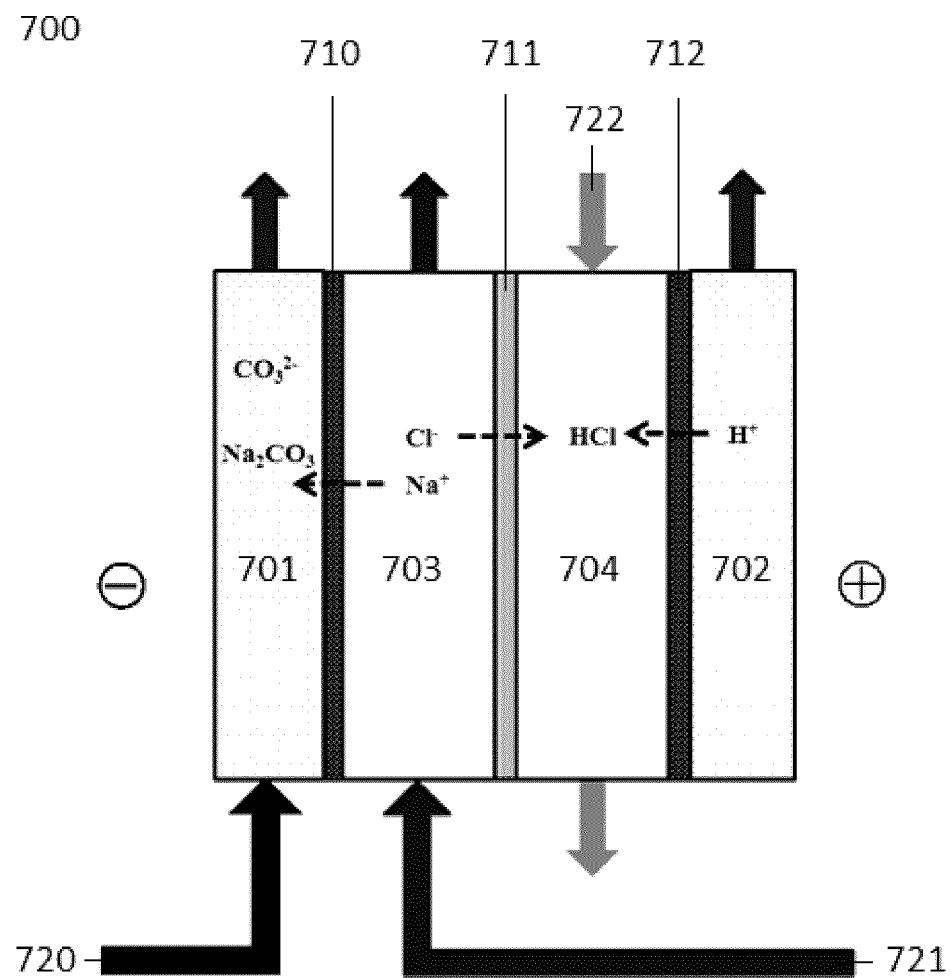
FIG. 7 is a schematic diagram of a four chamber electrodialysis cell according to an embodiment.

Referring to FIG. 7 and according to another embodiment, there is shown an electrodialysis cell 700 comprising a cathode in chamber 701 and an anode in chamber 702 at either end of the cell 700. Disposed between the chambers 701 and 702 are chambers 703 and 704. Disposed between: (i) cathode chamber 701 and chamber 703 is cation exchange membrane 710; (ii) chamber 703 and 704 is anion exchange membrane 711; and (iii) chamber 704 and anode chamber 702 is cation exchange membrane 712. In operation, an electric potential is applied between the cathode in chamber 701 and the anode in chamber 702 to cause electrochemical reactions (7) and (9) to occur and to facilitate migration of ions across the ion exchange membranes.

Solution 721 is delivered into chamber 703. Solution 721 may be any saltwater solution such as brine, seawater or wastewater, or any solution being treated to reduce the concentration of ions therein. Under the influence of a transport mechanism, cations (e.g. sodium ions) in chamber 703 migrate into cathode 701 through cation exchange membrane 710. Anions (e.g. chloride ions) in chamber 703 migrate through the anion exchange membrane 711 into chamber 704. Solution 721 with a reduced ion concentration exits chamber 703 and is recovered.

Gas is mixed with oxygen/air to form a fluid comprising gas 720, and fed onto the cathode in chamber 701. When the gas is carbon dioxide gas for example, the carbon dioxide may undergo half-cell reaction (9) at the cathode in chamber 701. Carbon dioxide may also be electro-reduced to other charged species such as bicarbonate and formate ions. Hydroxide ions ($OH^-$) may also be produced in the cathode chamber 701 depending on reaction conditions. The produced carbonate ions or hydroxide ions associate with the cations (e.g. sodium ions) that have migrated into chamber 701 through cation exchange membrane 710 to form a salt (e.g. sodium carbonate) or a base (e.g. sodium hydroxide). Fluid 720 with an increased concentration of salt (e.g. sodium carbonate) is recovered from chamber 701. The recovered fluid 720 may also have an increased concentration of a base (e.g. sodium hydroxide).

Solution 722 comprising water or acid is delivered into chamber 704. In chamber 704, anions (e.g. chloride ions) that have migrated into chamber 704 from chamber 703 associate with protons that have migrated into chamber 704 from anode chamber 702 through cation exchange membrane 712. These protons are generated by half-cell reaction (7) of water at the anode in chamber 702. Solution 722 with an increased concentrated of acid (e.g. hydrochloric acid) is recovered from chamber 704.

The electrodialysis and dialysis cells of the described embodiments convert at least a portion of the gas into salt, reduce the ion concentration of the solution being treated and produce an acid solution instead of harmful halogen gas such as chlorine gas. The concentrated salt, solution with reduced ion concentration and acid solution may be recovered and used for further application or may be safely disposed.

Figure 8:
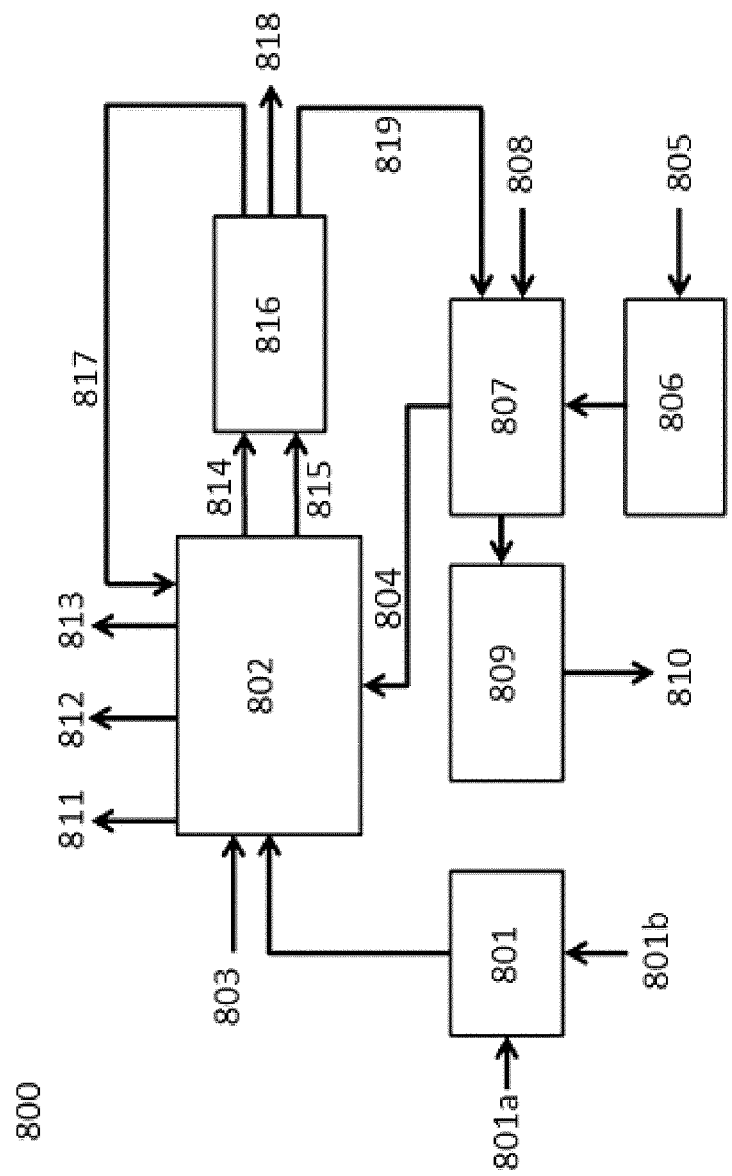
FIG. 8 is a flow diagram of a system incorporating an electrodialysis cell according an embodiment.

Cells 100, 200, 300, and 500 depicted in FIGS. 1, 2, 3 and 5 respectively may be incorporated into a larger system for power generation because of their ability to produce hydrogen gas. Referring to FIG. 8, there is shown a flow diagram of a gas removal and water treating system 800. In an exemplary embodiment using carbon dioxide as the gas and water as the solvent, carbon dioxide 801a is dissolved into water 801b to form a $CO_2/H_2O$ solution 801. The $CO_2/H_2O$ solution 801 containing dissolved bicarbonate and carbonate ions is directed into an electrodialysis cell 802 to which power 803 is applied. Also entering the electrodialysis cell 802 is a concentrated solution of salt water 804. Concentrated salt solution 804 is optionally produced by running salt water 805 (e.g. brine or seawater) through a salt-water treatment process 806 and a salt concentrator step 807. Waste heat 808 is introduced into the salt concentrator to produce concentrated salt solution 804. Excess water recovered during the salt concentrator step 807 is condensed by a condenser 809 to form condensed clean water stream 810.

As exemplified by cells 100, 200, 300 and 500 depicted in FIGS. 1, 2, 3 and 5, the electrodialysis cell 802 produces a concentrated acidic solution 811, desalinated water stream 812, and concentrated aqueous salt solution 813. Additionally, hydrogen gas 814 and oxygen gas 815 are formed at the cathode and anode respectively of electrodialysis cell 802. Hydrogen gas 814 and oxygen gas 815 are directed towards a power generator 816 for power generation, the products of which are water 817, power 818 and heat 819. Water 817 may be fed back into electrodialysis cell 802, fed into the desalinated water stream 812, fed into the condensed clean water stream 810 or used elsewhere. Heat 819 may be directed towards the salt concentrator step 807 to further accelerate the concentration of salt water. Generated power 818 may be recovered and used for different applications.

Figure 9:
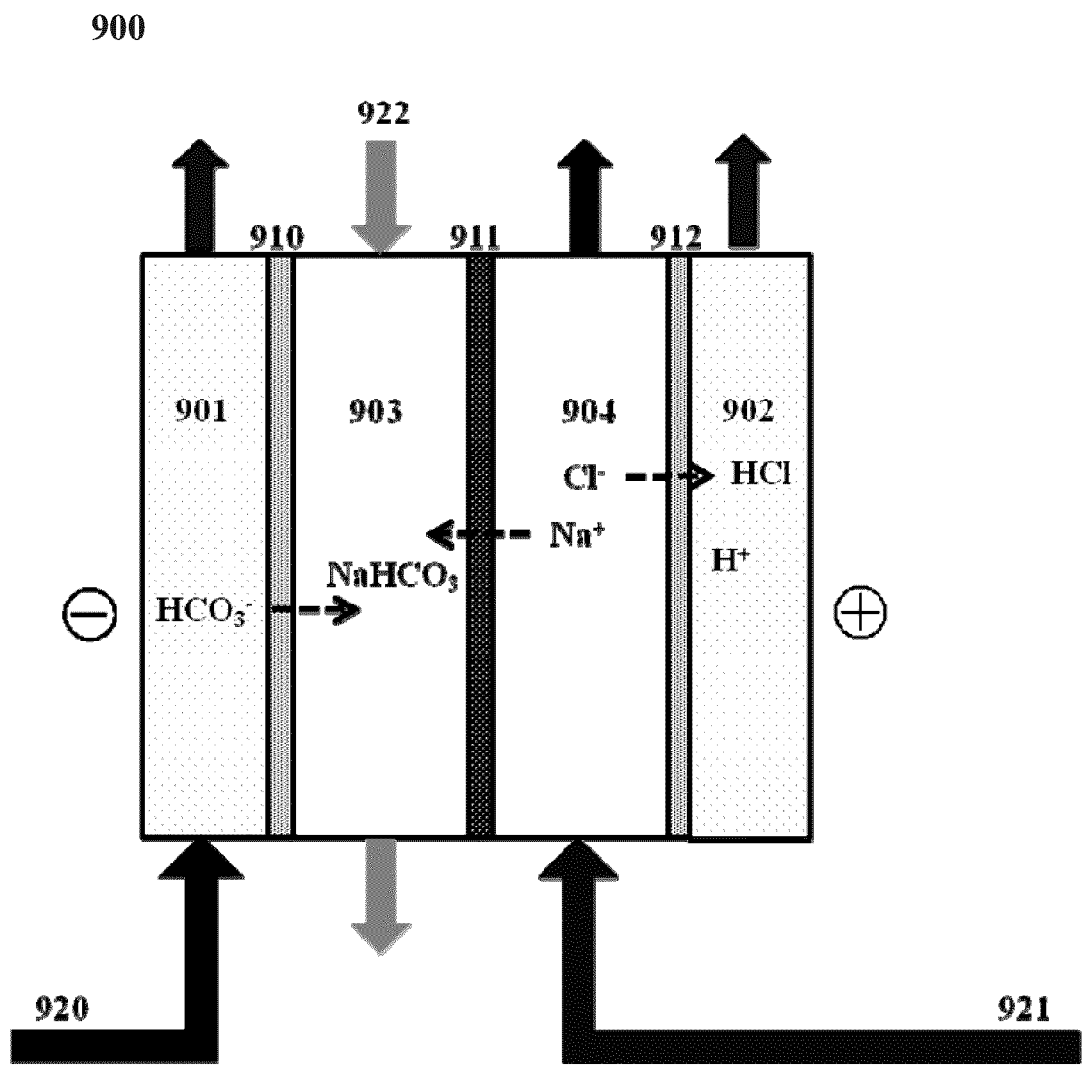
FIG. 9 is a schematic diagram of a four chamber electrodialysis cell according to an embodiment.

Referring to FIG. 9 and according to another embodiment, there is shown an electrodialysis cell 900 comprising a cathode in chamber 901 and an anode in chamber 902 at either end of the cell 900. Disposed between the chambers 901 and 902 are chambers 903 and 904. Disposed between: (i) cathode chamber 901 and chamber 903 is anion exchange membrane 910; (ii) chamber 903 and 904 is cation exchange membrane 911; and (iii) chamber 904 and anode chamber 902 is anion exchange membrane 912. In operation, an electric potential is applied between the cathode in chamber 901 and the anode in chamber 902 to cause electrochemical reactions (7) and (10) to occur and to facilitate migration of ions across the ion exchange membranes.

Solution 921 is delivered into chamber 904. Solution 921 may be any saltwater solution such as brine, seawater or wastewater, or any solution being treated to reduce the concentration of ions therein. Under the influence of a transport mechanism, cations (e.g. sodium ions) in chamber 904 migrate into chamber 903 through cation exchange membrane 911. Anions (e.g. chloride ions) in chamber 904 migrate through the anion exchange membrane 912 into anode chamber 902 and associate with protons ($H^+$) in the anode chamber 902 to form acid (e.g. HCl). Solution 921 with a reduced ion concentration exits chamber 904 and is recovered.

Gas is mixed with oxygen/air to form fluid 920, and fed onto the cathode in chamber 901. When the gas is carbon dioxide gas in solution for example, the carbon dioxide may undergo half-cell reaction (10) at the cathode in chamber 901 to form bicarbonate ions ($HCO_3^-$). Carbon dioxide may also be electro-reduced to other charged species such as carbonate and formate ions. Hydroxide ions ($OH^-$) may also be produced in the cathode chamber 901 depending on reaction conditions. The bicarbonate ions and hydroxide ions migrate across anion exchange membrane 910 into chamber 903 and associate with the cations (e.g. sodium ions) that have migrated into chamber 903 through cation exchange membrane 911 to form a salt (e.g. sodium bicarbonate) and a base (e.g. sodium hydroxide).

Solution 922 comprising water or ionic species is delivered into chamber 903. For example, solution 922 may be a solution containing sodium bicarbonate or sodium hydroxide. In chamber 903, anions (e.g. bicarbonate ions or hydroxide ions) associate with cations (e.g. sodium ions) to form salt (e.g. sodium carbonate) or a base (e.g. sodium hydroxide). Solution 922 containing an increased concentrated of salt (e.g. sodium carbonate) is recovered from chamber 903. The recovered solution 922 may also have an increased concentration of a base (e.g. sodium hydroxide).

In alternative embodiments (not shown), additional chambers may be added to the electrodialysis and dialysis cells described herein with reference to FIGS. 1-7 and 9. In alternative embodiments two or more dialysis cells may be stacked together in a system for converting gas and treating a solution. Each dialysis cell may be an electrodialysis cell, for example the electrodialysis cells shown in FIGS. 1-3, 5-7 and 9, with a cathode and anode included in each cell. The stacked system would have a solution (product) feed and a gas feed respectively feeding into the product chamber and the gas chamber of each cell. The cathode chamber at an end of one cell may be next to the anode chamber at an end of an adjacent cell in the stacked arrangement.

The multi-chamber dialysis cell of the disclosed embodiments may be used to carry out a method for reducing ion concentration of a solution and converting gas. The dialysis cell has ion exchange barriers separating chambers of the dialysis cell and comprises at least three chambers: (i) a gas chamber; (ii) a product chamber; and (iii) an acid chamber. One or more of the chambers may include an electrode. The multi-chamber dialysis cell may also include additional chambers such as a salt concentration chamber positioned between the product chamber and the gas chamber. A first anion exchange barrier is positioned between the product chamber and the acid chamber and a first cation exchange barrier is positioned between the product chamber and the gas chamber. The anion or cation exchange barrier is positioned somewhere between these chambers but not necessarily adjacent or bounding the chambers. The method comprises flowing a fluid comprising gas through the gas chamber, and flowing a solution being treated through the product chamber. Anions in the solution being treated migrate across the first anion exchange barrier to associate with cations in the acid chamber to form an acid solution in the acid chamber. Cations in the solution being treated migrate across the first cation exchange barrier to associate with anions from the fluid comprising gas to form salt. As a result the ion concentration of the solution being treated is reduced and at least a portion of the gas is converted into salt. The salt may be a carbonate, bicarbonate, formate, sulfate, sulfite, nitrate, nitrite or any other salt depending on the composition of the gas in the fluid.

The ion concentration of the solution being treated being fed into the product chamber of the dialysis cell may be monitored by an ion concentration sensor or the like positioned in the product chamber or in the manifolding conveying the solution being treated to the product chamber. Conditions within the cell may be controlled such that the ion concentration of the solution exiting the product chamber is within a predetermined range. For example, for the electrodialysis cell of the disclosed embodiments, the electric potential applied between the cathode and the anode may be increased or decreased to respectively increase or decrease desalination of the solution being treated in the cell. Other methods for changing the concentration of the solution exiting the product chamber include: changing the flow rate or concentration of solution fed into the salt concentration chamber; changing the number of electrodialysis units used in a system during operation, and/or changing the membrane area used during operation. In one embodiment, the salt concentration chamber may include an additional/auxiliary electrode which can be polarized independently from the anode and cathode of the electrodialysis cell. In additional embodiments the ion concentration of the solution being treated entering the product chamber or the ion concentration of the solution exiting the product chamber may be reduced or increased before or after the solution being treated respectively enters and exits the product chamber by a secondary ion concentration control unit. The ion concentration of the solution exiting the product chamber may also be monitored by a ion concentration sensor or the like positioned near or at the outlet of the product chamber or in the manifolding conveying the solution away from the product chamber, to ensure that the solution exiting the product chamber is within the predetermined range. This may be important where there are strict requirements on the ion concentration of solution exiting the product chamber in order for the solution to be recycled, reused or disposed of. A controller, such as a microprocessor or the like, may receive real time data regarding the concentration of the solution being treated in the product chamber (for example readings from the ion concentration sensors) and may use control algorithms to actuate an automatic response to fluctuations in ion concentration of the solution being treated being fed into the product chamber, for example increasing or decreasing the electric potential applied between the cathode and the anode as discussed above.

The concentration and/or pH of the acid solution in the acid chamber may be monitored by one or more sensor, such as an ion concentration or pH sensor, positioned in the acid chamber or in the manifolding conveying solution to and away from the acid chamber. Conditions within the cell may be controlled such that the concentration and/or pH of the acid solution in the acid chamber is within a predetermined range. For example, for the electrodialysis cell of the disclosed embodiments, the electric potential applied between the cathode and the anode may be controlled. Other methods for changing the concentration and/or pH of the acid solution in the acid chamber include: changing the flow rate or concentration of solution fed into the salt concentration chamber; changing the number of electrodialysis units used in a system during operation, and/or changing the membrane area used during operation. In one embodiment, the salt concentration chamber may include an additional/auxiliary electrode which can be polarized independently from the anode and cathode of the electrodialysis cell. A controller, such as a microprocessor or the like, may receive real time data regarding the concentration and/or pH of the acid solution in the acid chamber and may use control algorithms to actuate an automatic response to fluctuations in concentration and/or pH of the acid solution, for example increasing or decreasing the electric potential applied between the cathode and the anode as discussed above.

As discussed above the anode and cathode may contain a catalyst. Such catalysts are known in the art and may be selected for production of different chemical compounds at the anode and/or cathode. For example, the catalyst at the cathode may be selected for varying the amounts of bicarbonate (e.g., $NaHCO_3$) or carbonate (e.g., $Na_2CO_3$) ions being produced in the dialysis cell.

As discussed above, inorganic scaling of ion exchange barriers and/or ion exchange barrier fouling in the dialysis cell may be managed through polarity reversal, periodic flushes or acid washes. Another method of in-situ cleaning of the dialysis cell may use porous electrodes (such as mesh electrodes), hereafter referred to as "regenerating electrodes". In one embodiment, conductors, such as the conductors 432 and 433 may be used as regenerating electrodes. The regenerating electrodes may be placed on either side of a given ion exchange membrane which may then be polarized as desired. The polarizing method may be any galvano or potentiostatic electrochemical method applied by any combination of cycling, pulsed, transient, linear (or otherwise) modes of applying external fields to the regenerating electrodes. The applied current or voltage may be DC or AC, or a combination of these (e.g., AC with DC offset). This approach may be used for intermittent cleaning or to provide a continuous bias to reduce fouling. It may be useful to apply a voltage across the membrane (or chambers) using these regenerating electrodes for other reasons as well, for example, to reduce voltage requirements at the electrodes and locally increase the voltage gradient across a membrane or chamber that has higher ohmic losses. This may help make the electrode environments less corrosive and increase the lifetime of the cell components and/or the membrane. It may also allow for reactions to be controlled at the electrode by tuning the voltages for certain reactions and reduce production of unwanted species. The regenerating electrodes may also act capacitively (i.e. get charged and attract the ions), this may be useful for tuning the ion concentration. Once the electrodes/membrane become fully charged, they can be discharged into a separate tank thus releasing concentrated salt. A sequence of automated processes may be possible and the regenerating electrodes may have two-fold functionality: 1) regeneration of the membrane, 2) potential use in ion concentration control.

Hydrogen sulfide or sour gas ($H_2S$) is generally an unwanted component of natural gas which is toxic and also causes corrosion. $H_2S$ combusts with air to form sulfur dioxide ($SO_2$). Known processes for removing $H_2S$ and $SO_2$ are the Claus process for conversion of $H_2S$ to sulfur and the Wet Sulfuric Acid (WSA) process which combusts sulfur dioxide ($SO_2$) with oxygen in air eventually forming $H_2SO_4$ acid, and heat. The dialysis cell of the disclosed embodiments may be used to remove $H_2S$ and/or $SO_2$ gases flowing through the gas chamber. The $H_2S$ and/or $SO_2$ may be in the form of gas, humidified gas, or gas dissolved in solution. At the cathode, the following reaction may occur:

$$H_2S + 1.5O_2 \rightarrow SO_2 + H_2O \qquad (11)$$

$$O_2 + 2SO_2 + 4e \rightarrow 2SO_4^{2-} \qquad (12)$$

The end product may be $H_2SO_4$ acid or a salt or a mixture of both. The dialysis cell and method of the disclosed embodiments may therefore be useful in the oil and gas sector for removing $H_2S$ from natural gas.

In a further embodiment one or more ion exchange membranes of the dialysis cell are water permeable and water moves across the water permeable ion exchange membrane into the anode chamber of the dialysis cell from an adjacent chamber and/or water moves across the water permeable ion exchange membrane into the cathode chamber of the dialysis cell from an adjacent chamber. Movement of water into the anode and/or cathode chamber concentrates acid (e.g. HCl) in the acid solution and/or concentrate salt (e.g. $Na_2CO_3$) in their respective chambers. Movement of water to the anode and/or cathode chambers may be achieved by promoting water flux to these chambers through cell and membrane design. Movement of the water to the anode and/or cathode chambers and concentration of the acid in the acid solution and/or concentration of the salt occurs in-situ and may therefore be advantageous over external concentrator systems used to remove water to concentrate solutions. Operation may be automated by feedback loops using one or more sensors to sense the concentration of the acid solution and/or salt and when an increase/decrease in the concentration is required, the water content of the anode or cathode chamber may be adjusted so that the concentration of the acid solution and/or salt is maintained within a predetermined range. The process may be fully automated using a controller.

Examples

Three Chamber Gas-Phase Carbon Dioxide Electrodialysis Cell

The three chamber electrodialysis cell 600 shown in FIG. 6(b) was operated with a feed of carbon dioxide and air in fluid 621 in the cathode chamber 601 and an acidic water stream in the anode chamber 602. The cathode used a non-selective platinum (Pt) catalyst. The feed solution being treated 623 consisted of a 1 M NaCl solution. Cell operation started with an initialization of the solutions, by adding 10 mmol HCl to chamber 605 and 10 mmol $NaHCO_3$ to chamber 603 at the beginning of operation. The cell was operated for a total of eight hours at 3 V. The cell was operated at ambient temperature for the first four hours, then the temperature of the cell was increased to 40° C. and the cell was operated at 40° C. for the next four hours. The cell current density and voltage curves as a function of time are shown in FIG. 9. Overall, the cell achieved an average total current of ~52 mA during ambient operation and ~84 mA at 40° C. which corresponds to current densities of 16 and 26 mA/cm$^2$, respectively.

Production of Acid

The pH of the solutions in the salt concentration chamber 603, the product chamber 604 and the acid chamber 605 were monitored periodically throughout the testing period. The pH of the solution in the salt concentration chamber 603 and the acid chamber 605 are shown in FIG. 10.

Figure 10:
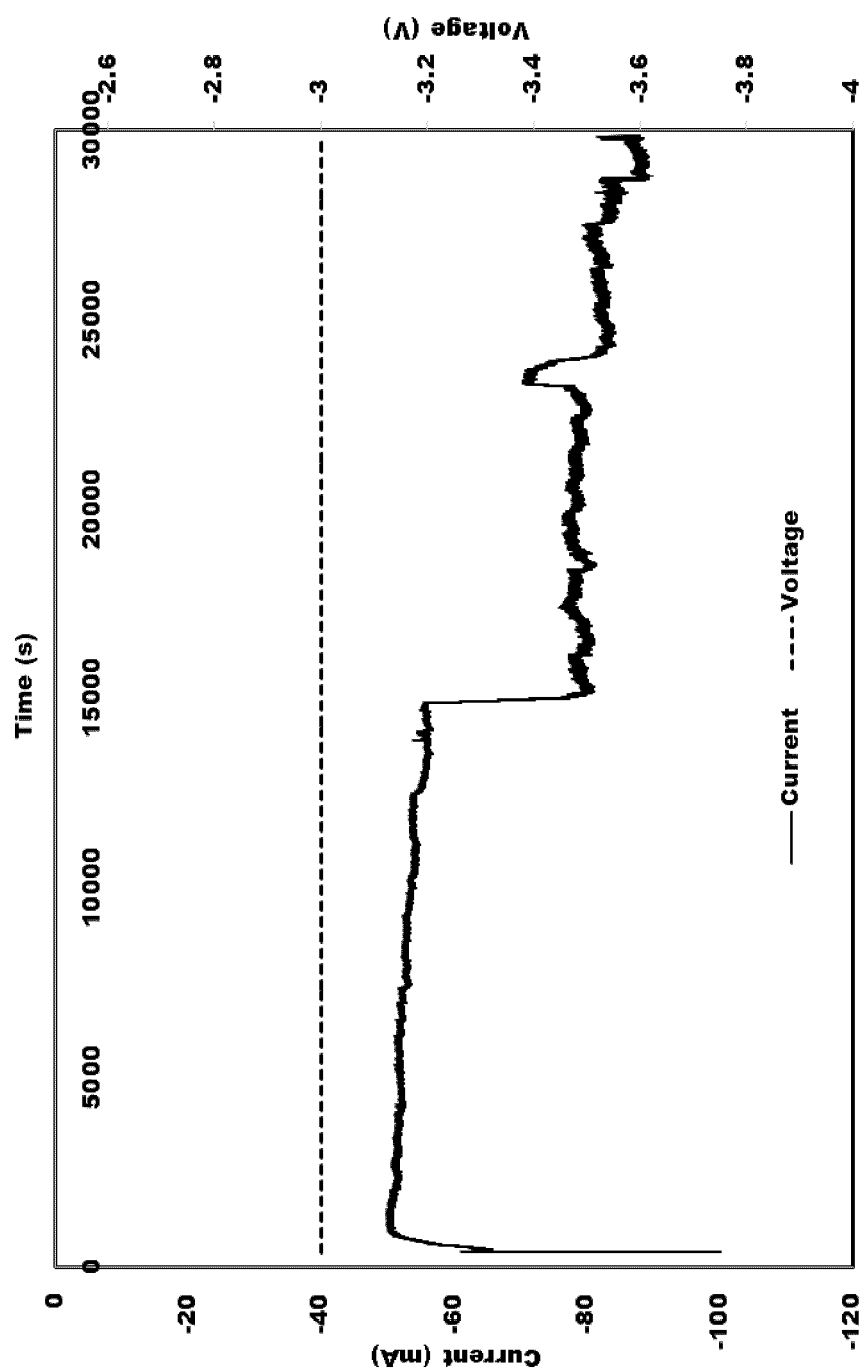

FIG. 10. shows production of acid as evidenced by the decrease in pH in the acid chamber 605 (product acid compartment) over time. The dotted line (pH HCl Faradaic) shows the expected pH change according to Faraday's law based on the amount of current passed through the electrodialysis cell 600. The measured pH change and the calculated Faradaic pH change track closely together and are within the precision of a pH meter.

Bicarbonate ions are alkaline pH buffers that form a stable pH around pH 8.3. The production of bicarbonate and hydroxide ions should increase the alkalinity of the solution in the salt concentration chamber 603. This was clearly observed in FIG. 10 as the pH of the salt in solution ($NaHCO_3$) in the salt concentration chamber 603 (product salt compartment) increased over time indicating the production of bicarbonate and hydroxide ions.

Production of Bicarbonate Salt from Carbon Dioxide

Samples of solution were obtained from the salt concentration chamber 603 and the acid chamber 605 at different time intervals. Samples from the salt concentration chamber 603 were titrated with hydrochloric acid to determine the concentration of different anions in solution 622. This technique is capable of differentiating between bicarbonate and carbonate or hydroxide ions but treats carbonate and hydroxide ions as the same. The results of the titration analysis are summarized in FIG. 11 which shows the change in bicarbonate ion concentration. FIG. 11 indicates an increase in production (concentration) of bicarbonate ions ($[HCO_3^-]$) over time in salt concentration chamber 603. As there are no other sources of carbon in electrodialysis cell 600 other than the carbon dioxide in fluid 621 fed into cathode chamber 601, these results indicate a removal of carbon dioxide from fluid 621 over time.

The dotted line ($[HCO_3^-]$ Faradaic) shows the expected change in concentration of bicarbonate ions if all current transferred through the electrodialysis cell 600 was converted to bicarbonate ions according to Faraday's law. While the bicarbonate ion concentration in salt concentration chamber 603 increased with time it does not track the expected concentration change as well as the acid concentration as discussed above. This is believed to be due to the use of a non-selective catalyst which also promotes the production of hydroxide and carbonate ions. As the anion exchange membrane 606 positioned between the cathode chamber 601 and the salt concentration chamber 603 was a monovalent anion exchange membrane, carbonate ions should not be have been able to permeate through to the salt concentration chamber 603. The concentration of hydroxide ions ($[OH^-]$) produced in salt concentration chamber 603 over time was calculated and plotted in FIG. 11. Here, it was assumed that all current not used for producing bicarbonate ions contributed to hydroxide ions. The sum concentration of hydroxide ions and bicarbonate ions ($[HCO_3^-]+[OH^-]$ shown on FIG. 11 matches relatively closely with the expected Faradaic concentration change.

Cell Performance Improvements as a Function of Concentration

FIG. 12 shows cell polarization curves (voltage and current density) developed for different concentrations of $NaHCO_3$. Cell performance improves with increase in concentration as solution resistance within the cell chambers decreases. Similar improvements are expected with increases in the acid concentration. This indicates the cell's ability to handle different concentrations of the feed and products.

CELL Performance Improvements as a Function of Temperature

FIG. 13 shows cell polarization curves (voltage and current density) developed for ambient temperature operation as well as operation at 40° C. As shown in FIG. 13, cell performance improved at 40° C. compared to ambient temperature as increasing temperature helps reduce both resistance and kinetic losses. FIG. 10-12 also indicate cell performance improvements over time with an increase in the total product formed for the 8 hour cell operation. This indicates not only the cell's ability for operation at elevated temperatures but also that further increases in temperature may improve cell performance.

While the present disclosure is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. Accordingly, departures may be made from the specific details, representative apparatus and methods, and illustrative examples shown and described without departing from the spirit or scope of the general concept.

The invention claimed is:

1. A method for producing an acid and a salt, the method comprising:
   (a) providing a multi-chamber dialysis cell with ion exchange barriers comprising a first anion exchange barrier and a first cation exchange barrier, the ion exchange barriers separating chambers of the dialysis cell, the dialysis cell comprising:
      (i) a gas chamber;
      (ii) a product chamber;
      (iii) an acid chamber;
      (iv) the first anion exchange barrier positioned between the product chamber and the acid chamber;
      (v) the first cation exchange barrier positioned between the product chamber and the gas chamber;
      (vi) a cathode in the gas chamber; and
      (vii) an anode;
      wherein the first anion exchange barrier and the first cation exchange barrier are between the cathode and the anode;
   (b) flowing a fluid consisting of a gas in the gas phase or a mixture of the gas in the gas phase with one or more other gases in the gas phase through the gas chamber, and flowing a first solution through the product chamber; and
   (c) applying an electric potential between the anode and the cathode
   wherein:
      the gas is carried by the fluid to the cathode and, at the cathode, the gas in the gas phase undergoes a half-cell reaction at the cathode to yield first anions, wherein the gas comprises carbon dioxide, hydrogen sulfide, sulfur dioxide, nitrogen dioxide, or a combination thereof;
      second anions in the first solution migrate across the first anion exchange barrier to associate with cations in the acid chamber to form an acid solution comprising the acid in the acid chamber; and
      cations in the first solution migrate across the first cation exchange barrier to associate with the first anions to form the salt, thereby reducing the ion concentration of the first solution and converting at least a portion of the gas into the salt.

2. The method according to claim 1, further comprising removing the acid solution, the first solution with reduced ion concentration, and the salt from the dialysis cell.

3. The method according to claim 1, further comprising flowing a second solution through a salt concentration chamber positioned between the product chamber and the gas chamber,
   wherein the cations from the first solution migrate across the first cation exchange barrier to the salt concentration chamber, and the first anions migrate to the salt concentration chamber across a second anion exchange membrane positioned between the gas chamber and the salt concentration chamber, wherein the cations from the first solution and the first anions associate to form the salt in the salt concentration chamber, thereby increasing the salt concentration of the second solution flowing through the salt concentration chamber.

4. The method according to claim 1, further comprising flowing the acid solution through the acid chamber.

5. The method according to claim 1, wherein the anode and/or the cathode comprises a catalyst.

6. The method according to claim 5, wherein the anode is positioned in the acid chamber.

7. The method according to claim 1, further comprising monitoring ion concentration of the first solution and controlling conditions within the dialysis cell to maintain the ion concentration of the first solution within a predetermined range.

8. The method according to claim 1, further comprising monitoring concentration and/or pH of the acid solution in the acid chamber and controlling conditions within the dialysis cell to maintain the concentration and/or pH of the acid solution within a predetermined range.

9. The method of claim 8, wherein the concentration and/or pH of the acid solution in the acid chamber is monitored using one or more sensors.

10. The method according to claim 1, wherein one or more of the ion exchange barriers comprise a catalyst.

11. The method of claim 1, wherein the gas comprises carbon dioxide.

12. The method of claim 11 wherein the first anions comprise bicarbonate anions, carbonate ions, formate anions or a mixture thereof.

13. The method of claim 1, wherein the gas comprises hydrogen sulphide and/or sulphur dioxide.

14. The method of claim 1, wherein the gas additionally comprises oxygen.

15. The method of claim 1, comprises supplying air and/or oxygen to the cathode.

* * * * *